United States Patent
Clements et al.

(10) Patent No.: US 12,090,964 B2
(45) Date of Patent: Sep. 17, 2024

(54) FOLDABLE PICNIC TABLE CARRIER FOR USE ON RECREATIONAL VEHICLES

(71) Applicant: Trailer Pros, LLC, Harrison, OH (US)

(72) Inventors: Ryan Clements, Hamilton, OH (US); Russell Clements, Liberty Township, OH (US); Randy M. Koon, West Chester, OH (US)

(73) Assignee: TRAILER PROS, LLC, Harrison, OH (US)

( * ) Notice: Subject to any disclaimer, the term of this patent is extended or adjusted under 35 U.S.C. 154(b) by 246 days.

(21) Appl. No.: 17/591,570

(22) Filed: Feb. 2, 2022

(65) Prior Publication Data
US 2022/0242325 A1    Aug. 4, 2022

Related U.S. Application Data

(60) Provisional application No. 63/145,381, filed on Feb. 3, 2021.

(51) Int. Cl.
*B60R 9/00*    (2006.01)

(52) U.S. Cl.
CPC ..................... *B60R 9/00* (2013.01)

(58) Field of Classification Search
CPC .. B60R 9/00; B60R 9/02; B60R 5/045; B60R 5/041; B60R 5/003; A47C 17/80
USPC ............. 296/24.44, 37.14; 280/769
See application file for complete search history.

(56) References Cited

U.S. PATENT DOCUMENTS

| | | | | |
|---|---|---|---|---|
| 3,764,048 A | * | 10/1973 | Gore | B60R 9/02 224/538 |
| 4,564,134 A | * | 1/1986 | Seibert | B60R 9/00 224/538 |
| 4,878,605 A | * | 11/1989 | Doyle | B60P 3/00 224/538 |

(Continued)

FOREIGN PATENT DOCUMENTS

| | | | | |
|---|---|---|---|---|
| CA | 3081188 A1 | * | 11/2021 | B60R 19/38 |
| WO | WO-2008076016 A1 | * | 6/2008 | B62D 25/10 |

OTHER PUBLICATIONS www.pinterest.com/pin/532902568385808073/ (screenshot of one frame of website video), available at least as early as Jan. 21, 2021.

(Continued)

*Primary Examiner* — Pinel E Romain
(74) *Attorney, Agent, or Firm* — Porter Wright Morris Arthur LLP

(57) ABSTRACT

A carrier for supporting a foldable picnic table at an undercarriage of a recreational vehicle includes parallel and spaced-apart left and right rail assemblies. The left rail assembly includes a left rail forming an upward-facing support surface configured to engage and support the table thereon, and front and rear mounting brackets spaced-apart along the left rail and upwardly-extending from the left rail. The front and rear mounting brackets of the left rail are configured to be secured to the undercarriage of the recreational vehicle. The horizontal distance between the front and rear mounting brackets and the vertical distance between each of the left and right mounting brackets and the left rail are adjustable. The right rail assembly is a mirror image of the left rail assembly.

20 Claims, 17 Drawing Sheets

(56) References Cited

U.S. PATENT DOCUMENTS

| | | | | |
|---|---|---|---|---|
| 4,883,306 A * | 11/1989 | Stucky | ............... | B60P 3/32 |
| | | | | 52/143 |
| 4,915,437 A * | 4/1990 | Cherry | ............... | B60R 11/06 |
| | | | | 211/151 |
| 4,948,169 A * | 8/1990 | Amundson | ............... | B62D 43/002 |
| | | | | 224/538 |
| 5,051,046 A * | 9/1991 | Oren | ............... | B60P 3/08 |
| | | | | 410/29.1 |
| 5,193,878 A | 3/1993 | Weaver | | |
| 6,347,831 B1 * | 2/2002 | Nye | ............... | A47B 3/14 |
| | | | | 297/118 |
| 6,742,979 B1 * | 6/2004 | Salazar | ............... | B60R 9/02 |
| | | | | 414/522 |
| 6,869,092 B1 * | 3/2005 | Henn | ............... | B60R 3/02 |
| | | | | 280/166 |
| 6,971,707 B1 * | 12/2005 | Mullan | ............... | B60P 3/39 |
| | | | | 296/159 |
| 7,004,486 B1 * | 2/2006 | Farkash | ............... | B60R 3/002 |
| | | | | 296/37.6 |
| 8,002,336 B2 * | 8/2011 | Reeb | ............... | E02F 9/00 |
| | | | | 296/193.07 |
| 8,684,453 B2 | 4/2014 | Furst | | |
| 9,596,931 B1 * | 3/2017 | Nimgulkar | ............... | A47B 88/49 |
| 2007/0007784 A1 * | 1/2007 | Doyle | ............... | B60R 5/041 |
| | | | | 296/37.1 |
| 2008/0061543 A1 * | 3/2008 | Gardner | ............... | B60R 5/041 |
| | | | | 280/769 |
| 2008/0083352 A1 | 4/2008 | Tovani | | |
| 2020/0094748 A1 | 3/2020 | Garceau | | |
| 2022/0087883 A1 * | 3/2022 | Cha | ............... | B60R 11/00 |

OTHER PUBLICATIONS www.irv2.com/forums/f59/picnic-table-under-carrier-85372.html, available at least as early as Jan. 21, 2021.

www.keystoneforums.com/forums/showthread.php?t=25585, available at least as early as Jan. 21, 2021.

* cited by examiner

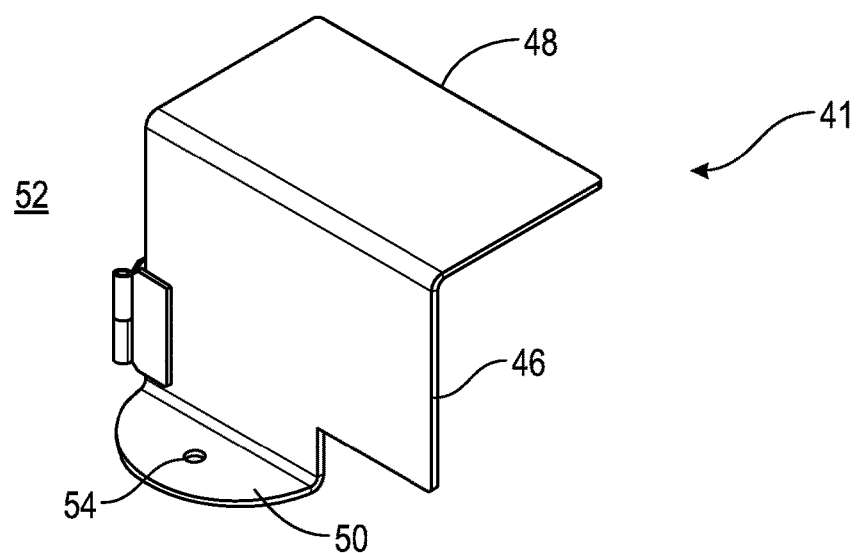
FIG. 13
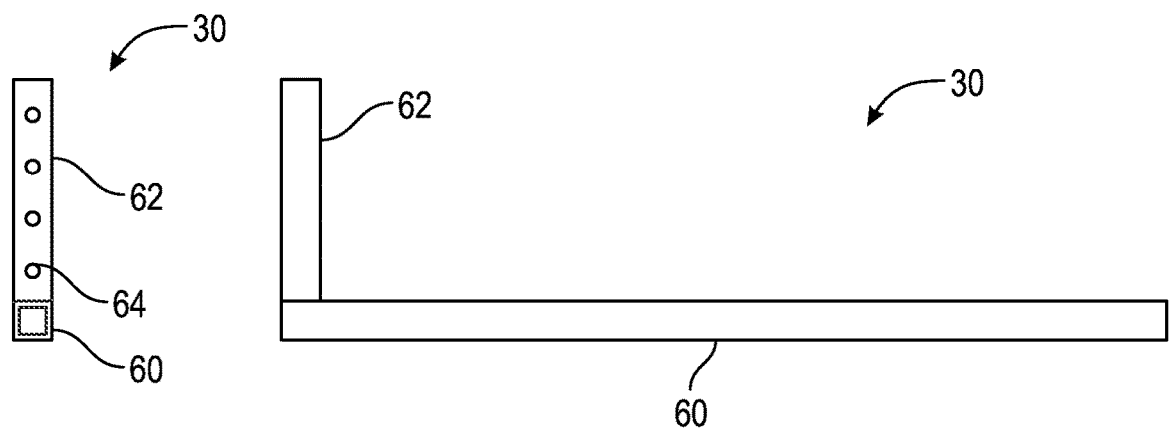
FIG. 14
FIG. 15

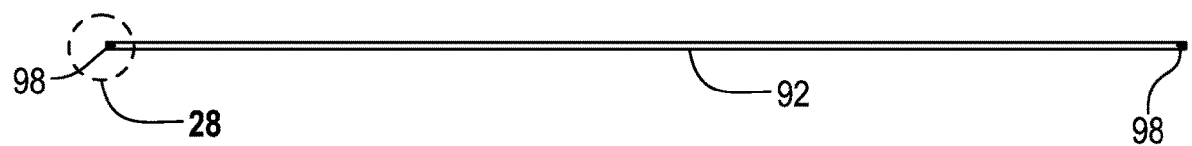
FIG. 27
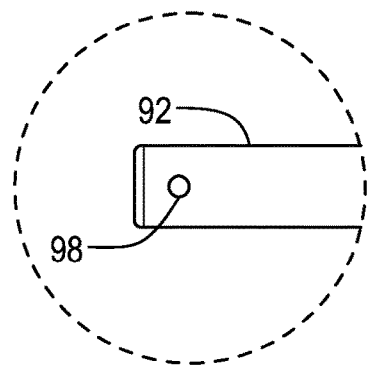 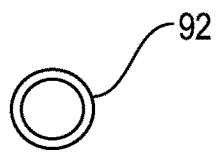
FIG. 28        FIG. 29

FOLDABLE PICNIC TABLE CARRIER FOR USE ON RECREATIONAL VEHICLES

CROSS-REFERENCE TO RELATED APPLICATIONS

This application claims the priority benefit of U.S. provisional patent application No. 63/145,381 filed on Feb. 3, 2021, the disclosure of which is expressly incorporated herein in its entirety by reference.

STATEMENT REGARDING FEDERALLY SPONSORED RESEARCH

Not applicable

PARTIES TO A JOINT RESEARCH AGREEMENT

Not Applicable

REFERENCE TO APPENDIX

Not applicable

FIELD OF THE INVENTION

The field of the present invention relates to carriers for use with vehicles and, more particularly, to carriers for use with recreational vehicles to transport items.

BACKGROUND OF THE INVENTION

A recreational vehicle (RV) is a motor vehicle or trailer designed for camping and typically includes living quarters designed for accommodations. Types of RVs include motorhomes, campervans, caravans (also known as travel trailers and camper trailers), fifth-wheel trailers, popup campers, truck campers, toy haulers, and the like. Typical amenities of an RV include a kitchen, a bathroom, and one or more sleeping facilities. RVs can range from the utilitarian— containing only sleeping quarters and basic cooking facilities—to the luxurious, including features such as, for example, air conditioning (AC), water heaters, televisions and satellite receivers, and quartz countertops. RVs can either be trailers (which are towed behind motor vehicles) or self-motorized. Most RVs are single-deck; however, double-deck RVs also exist. To allow a more compact size while in transit, larger RVs often have expandable sides (often referred to as slide-outs) or canopies/awnings.

When traveling in an RV many supplies are often brought along to make the camping experience more enjoyable. For example, an outdoor table and chairs such as a foldable picnic table are often brought along to experience eating and/or relaxing outdoors. This is particularly true when you are stopping at locations other than official camp grounds or at camp grounds that have picnic tables that have not been adequately cared for. See U.S. Pat. No. 6,347,831 for an example of a popular foldable picnic table, the disclosure of which is expressly incorporated herein in its entirety by reference.

Many RVs include storage compartments that can be accessed from outside the vehicle as well as interior storage. While the storage space is typically adequate, it can quickly fill up when going on a lengthy trip. This is particularly true when some of the items being stored are an outdoor table and chairs such as a foldable picnic table.

Accordingly, there exists a need for a foldable picnic table carrier for use on recreational vehicles and the like.

SUMMARY OF THE INVENTION

The present invention provides adequate systems, devices and methods which address at least one of the above-noted problems of the prior art. Disclosed herein is a carrier for supporting a table at an undercarriage of a recreational vehicle. The carrier comprises, in combination, a left rail assembly and a right rail assembly. The left and right rail assemblies are parallel and spaced-apart. The left rail assembly includes a left rail forming an upward-acing support surface configured to engage and support the table thereon, and front and rear mounting brackets spaced-apart along the left rail and upwardly-extending from the left rail. The front and rear mounting brackets of the left rail are configured to be secured to the undercarriage of the recreational vehicle. A height of the front and rear mounting brackets above the left rail is adjustable. The right rail assembly includes a right rail forming an upward-facing support surface configured to engage and support the table thereon, front and rear mounting brackets spaced-apart along the right rail and upwardly-extending from the right rail. The front and rear mounting brackets of the right rail are configured to be secured to the undercarriage of the recreational vehicle. A height of the front and rear mounting brackets above the right rail is adjustable.

Also disclosed is a carrier for supporting a table at an undercarriage of a recreational vehicle that comprises, in combination, a left rail assembly and a right rail assembly. The left rail assembly includes a left rail forming an upward-facing support surface configured to engage and support the table thereon, and front and rear mounting brackets spaced-apart along the left rail and upwardly-extending from the left rail. The front and rear mounting brackets of the left rail are configured to be secured to the undercarriage of the recreational vehicle. A distance between the front and rear mounting brackets of the left rail is adjustable. The right rail assembly includes a right rail forming an upward-facing support surface configured to engage and support the table thereon, and front and rear mounting brackets spaced-apart along the right rail and upwardly-extending from the right rail. The front and rear mounting brackets of the right rail are configured to be secured to the undercarriage of the recreational vehicle. A distance between the front and rear mounting brackets of the right rail is adjustable.

Further disclosed is a carrier for supporting a table at an undercarriage of a recreational vehicle comprising, in combination, a left rail assembly, a right rail assembly, and at least one table retaining member. The left rail assembly includes a left rail forming an upward-facing support surface configured to engage and support the table thereon, and front and rear mounting brackets spaced-apart along the left rail and upwardly-extending from the left rail. The front and rear mounting brackets of the left rail are configured to be secured to the undercarriage of the recreational vehicle. The right rail assembly includes a right rail forming an upward-facing support surface configured to engage and support the table thereon, and front and rear mounting brackets spaced-apart along the right rail and upwardly-extending from the right rail. The front and rear mounting brackets of the right rail are configured to be secured to the undercarriage of the recreational vehicle. The at least one table retaining member is selectively movable between a blocking position wherein the table retaining member blocks the table from being removed from the left and right rails and an unblocking position wherein the table retaining member permits the table to be removed from the left and right rails.

From the foregoing disclosure and the following more detailed description of various preferred embodiments it will be apparent to those skilled in the art that the present invention provides a significant advance in the technology and art of systems, devices, and methods for storing picnic tables on recreational vehicles and the like. Particularly, significant in this regard is the potential the invention affords for providing reliable, inexpensive, convenient and effective systems, devices, and methods for storing foldable picnic tables on a wide variety of different sizes and types of recreational vehicles and the like. Additional features and advantages of the invention will be better understood in view of the detailed description provided below.

BRIEF DESCRIPTION OF THE DRAWINGS

These and further objects of the invention will become apparent from the following detailed description.

FIG. 13 is a is a perspective view of a left table retaining door of the left rail of FIGS. 10 to 12.

FIG. 14 is a rear view of a rear mounting bracket extender of the left rail assembly of FIGS. 8 to 11.

FIG. 15 is a left side view of the rear mounting bracket extender of FIG. 14.

FIG. 27 is an enlarged rear view of a table retaining bar of the carrier of FIGS. 24 to 26.

FIG. 28 is a fragmented and enlarged view of an end of the table retaining bar of FIG. 27.

FIG. 29 is an end view of the table retaining bar of FIGS. 27 and 28.

Figure 1:
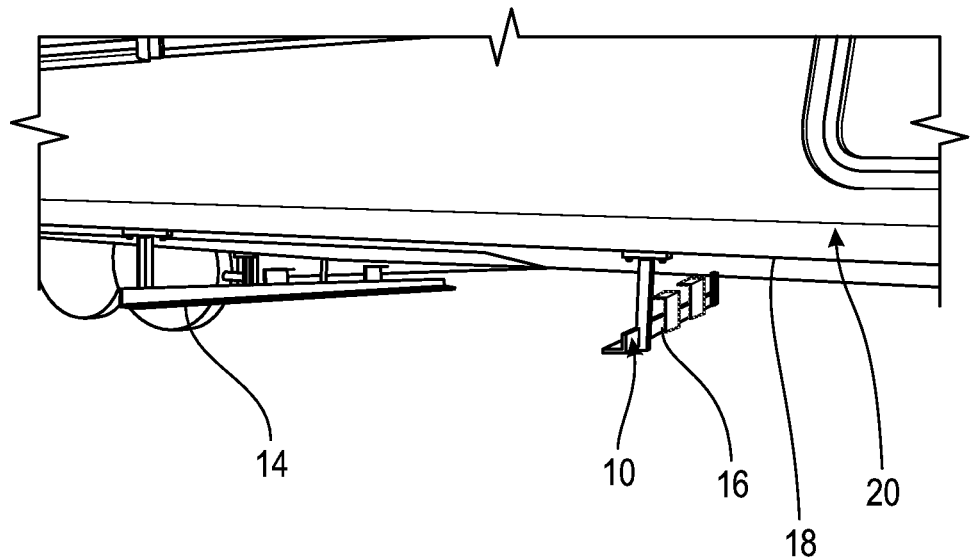
FIG. 1 is a perspective view a foldable picnic table carrier according to a first embodiment the present invention that is mounted to the undercarriage of a recreational vehicle, and wherein table retaining members have been removed from the rear end of the carrier for clarity.

It should be understood that the appended drawings are not necessarily to scale, presenting a somewhat simplified representation of various preferred features illustrative of the basic principles of the invention. The specific design features of the various carriers as disclosed herein, including, for example, specific dimensions, orientations, locations, and shapes will be determined in part by the particular intended application and use environment. Certain features of the illustrated embodiments may have been enlarged or distorted relative to others to facilitate visualization and clear understanding. In particular, thin features may be thickened, for example, for clarity or illustration. All references to direction and position, unless otherwise indicated, refer to the orientation of the structures illustrated in the drawings. In general, up or upward generally refers to an upward direction out the plane of the page in FIG. 4 and down or downward generally refers to a downward direction into the plane of the page in FIG. 4. Also in general, fore or forward generally refers to an upward direction within the plane of the page in FIG. 4 and aft or rearward generally refers to a downward direction within the plane of the page in FIG. 4. Additionally in general, left or leftward generally refers to a leftward direction within the plane of the page in FIG. 4 and right or rightward generally refers to a rightward direction within the plane of the page in FIG. 4.

DETAILED DESCRIPTION OF CERTAIN PREFERRED EMBODIMENTS

It will be apparent to those skilled in the art, that is, to those who have knowledge or experience in this area of technology, that many uses and design variations are possible for the systems, devices, methods disclosed herein. The following detailed discussion of various alternative and preferred embodiments will illustrate the general principles of the invention with regard to the specific application of carrying a foldable picnic table on the undercarriage of a recreational vehicle. Other embodiments suitable for other applications will be apparent to those skilled in the art given the benefit of this disclosure.

Figure 2:
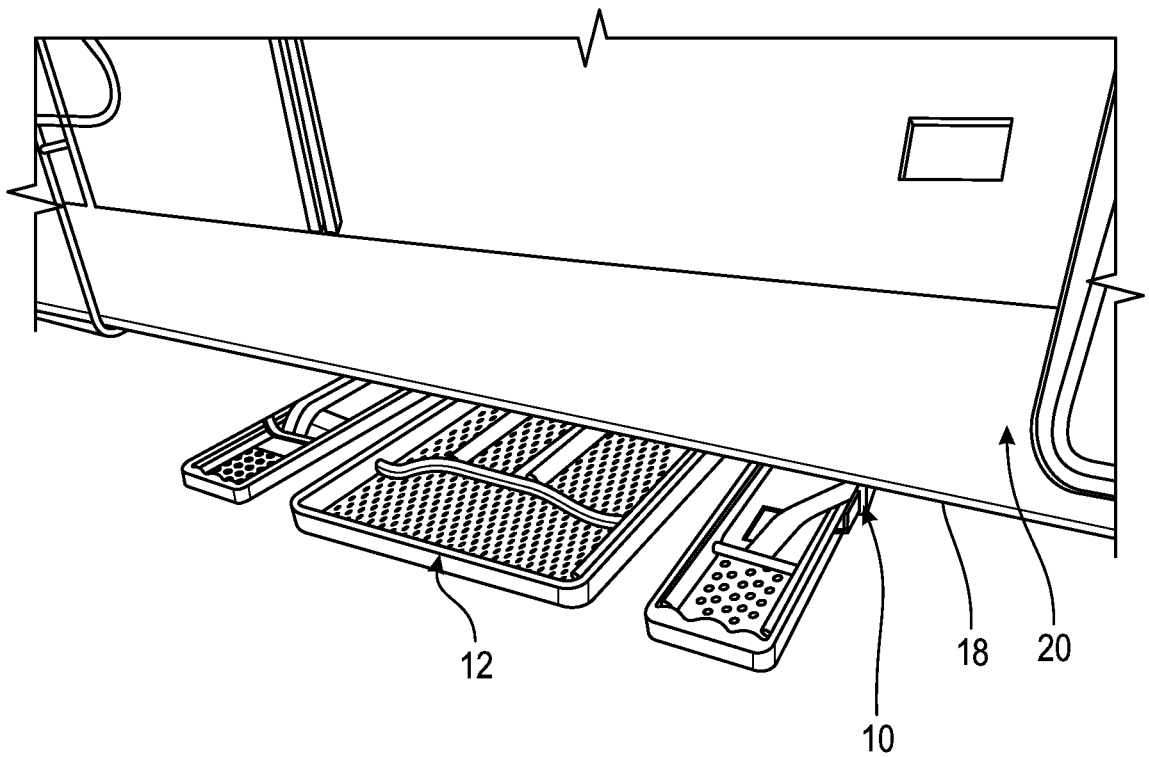
FIG. 2 is a perspective view similar to FIG. 1 but with a foldable picnic carrier partially inserted into the carrier of FIG. 1.
Figure 3:
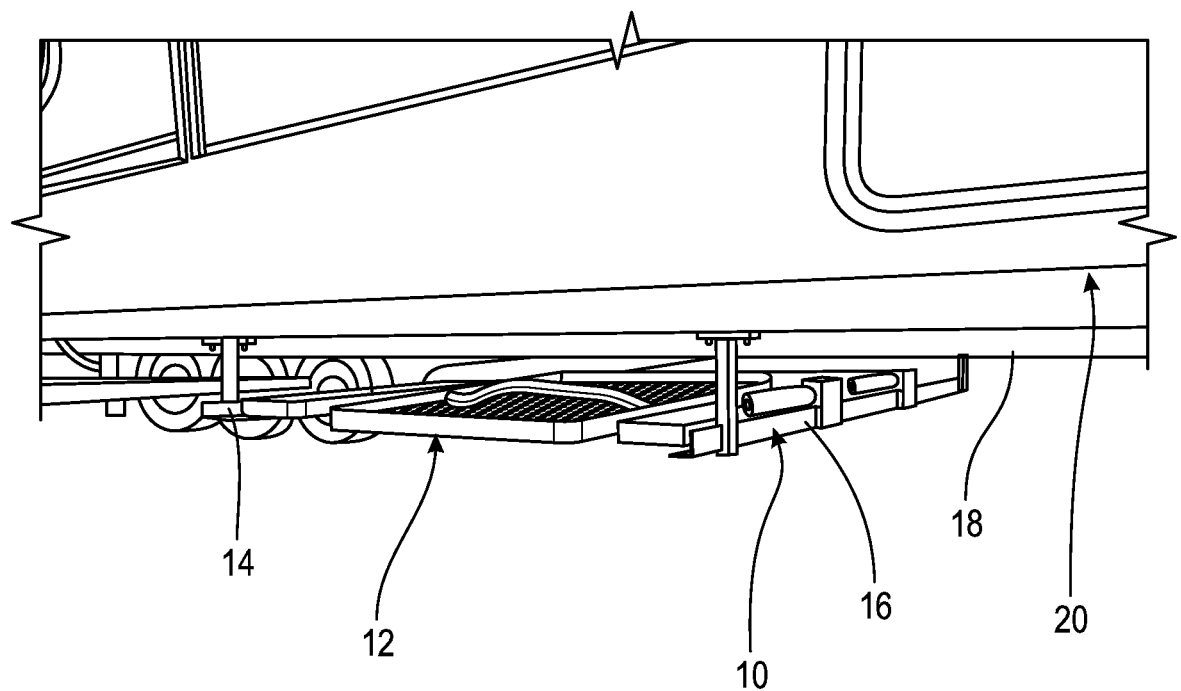
FIG. 3 is a perspective view similar to FIGS. 1 and 2, but with the foldable picnic table fully inserted into the carrier.

FIG. 1 illustrates a carrier 10 for a foldable picnic table 12 according to the present invention. The illustrated carrier includes right and left rail assemblies 14, 16 mounted to the undercarriage 18 of a recreational vehicle 20. The left and right rail assemblies 14, 16 are mounted parallel and extend laterally across the bottom of the recreational vehicle 20 and are spaced-apart in the forward/rearward direction of the recreational vehicle 20. FIG. 2 illustrates the foldable picnic table 12 partially slid onto the rear ends of the left and right rail assemblies 14, 16. FIG. 3 illustrates the foldable picnic table 12 fully on and supported by the right and left rail assemblies 14, 16.

Figure 4:
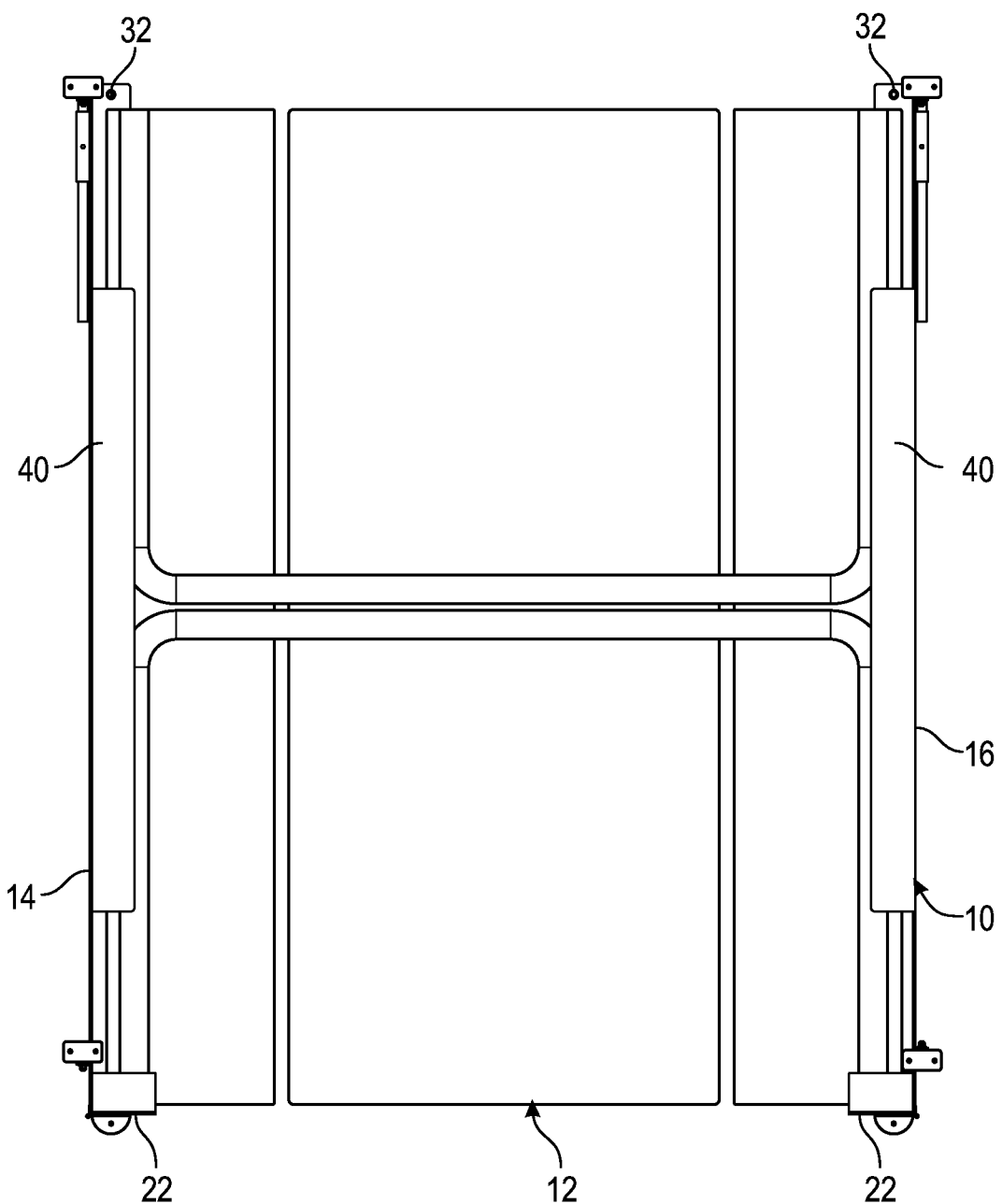
FIG. 4 is a top view of the foldable picnic table fully inserted into and retained within the carrier of FIGS. 1 to 3, but wherein the carrier is shown not mounted to the undercarriage of the recreational vehicle.
Figure 5:
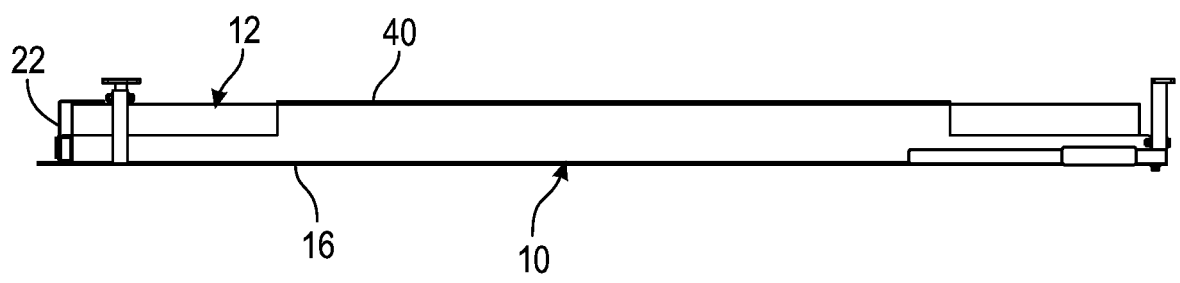
FIG. 5 is a right side view of the carrier of FIG. 4 with the foldable picnic table fully inserted into and retained within the carrier.
Figure 6:
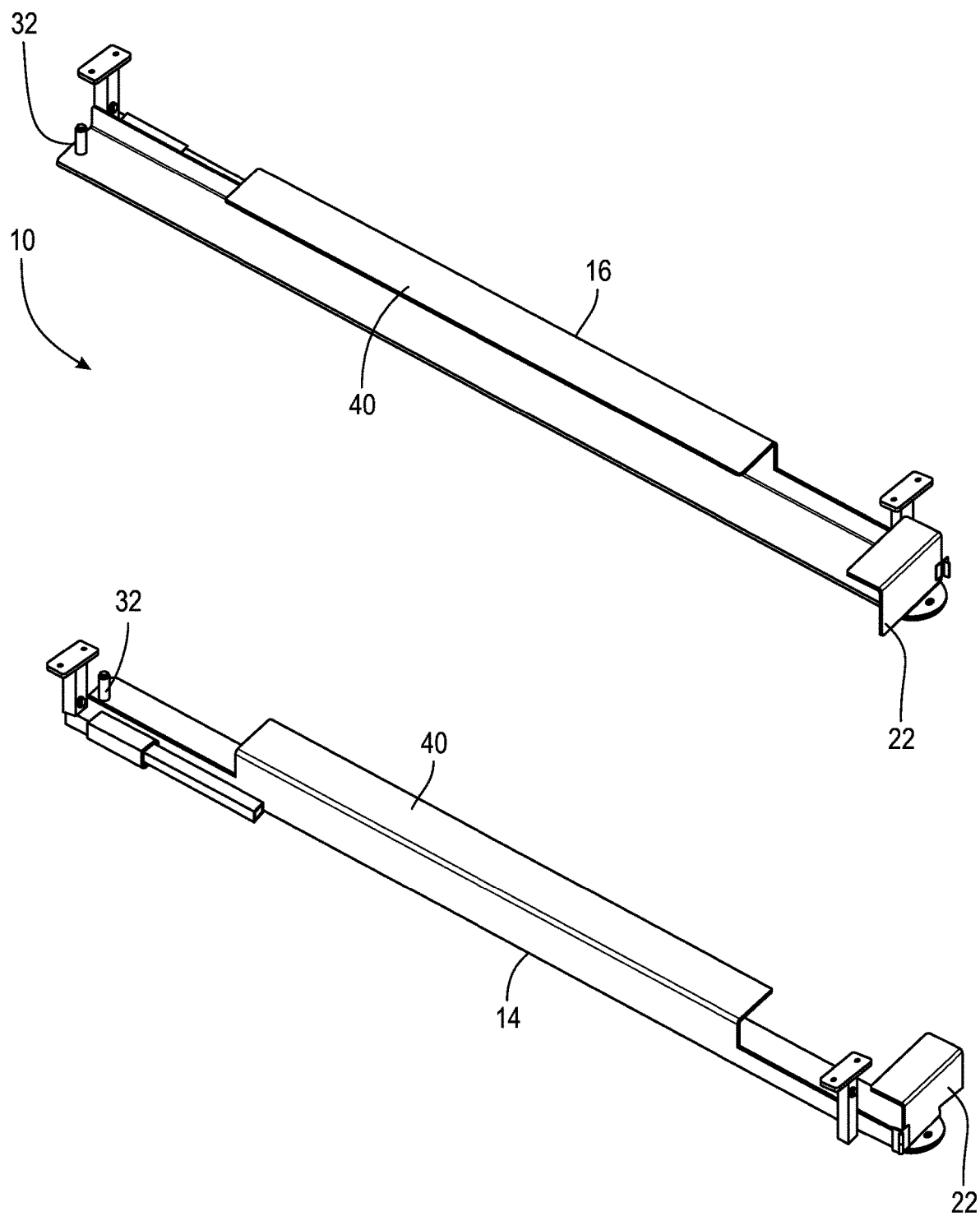
FIG. 6 is a perspective view of the carrier of FIGS. 1 to 5.
Figure 7:
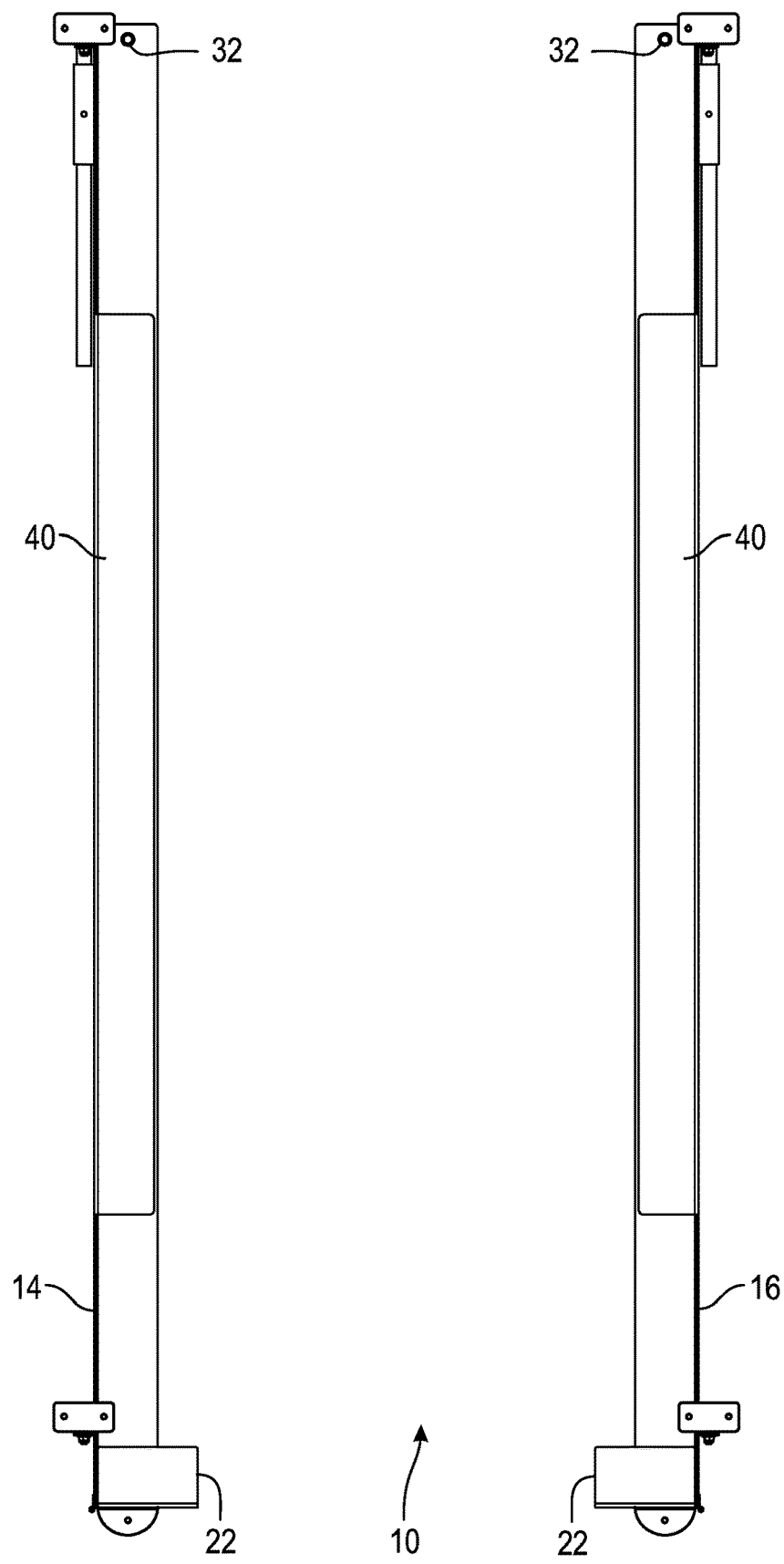
FIG. 7 is a top view of the carrier of FIG. 6.

FIGS. 4 and 5 illustrate the foldable picnic table 12 supported on and retained to the left and right rail assemblies 14, 16 with the left and rail assemblies 14, 16 unmounted to the recreational vehicle 20. FIGS. 6 and 7 illustrate the carrier 10 which includes the left and right rail assemblies 14, 16 without the foldable picnic table 12 supported thereon. Side edges of the foldable picnic table 12 are supported on the left and right rail assemblies 14, 16. Lateral movement of the foldable picnic table 12 is limited by the left and right rail assemblies 14, 16. Vertical movement of the foldable picnic table 12 off of the left and right rail assemblies 14, 16 is limited by retaining brackets 40 of the left and right rail assemblies 14, 16 that horizontally extend over the side edges of the foldable picnic table 12 as described in more detail hereinafter. Forward movement of the foldable picnic table 12 off of the forward end of the carrier 10 is limited by forward stops 32 which vertically extend from each front end of the left and right rail assemblies 14, 16 in front of the foldable picnic table 12 as described in more detail hereinafter. Rearward movement of the foldable picnic table 12 off of the rear end of the carrier 10 is limited by at least one moveable table retaining member 22. The illustrated embodiment includes two moveable table restraining members 22 one on each of the rearward ends of the left and right rail assemblies 14, 16. The movable table retaining members 22 are provided to selectively retain the foldable picnic table 12 on the left and right rail assemblies 14, 16 in the rearward direction. When the table retaining member(s) 22 is in a blocking position, the table retaining member(s) 22 prevents the foldable picnic table 12 from being removed from or accidentally fall off of the left and right rail assemblies 14, 16 in the rearward direction. However, when the table retaining member(s) 22 is moved to an unblocking position, the foldable picnic table 12 can be placed onto or removed from the left and right rail assemblies 14, 16 at the rearward end of the left and right rail assemblies 14, 16. The illustrated table retaining members 22 are in the form of left and right table retaining doors secured to the rear end of the left and right rail assemblies 14, 16 respectively as described in more detail below. It is noted that there can alternatively be any other suitable quantity of the table retaining member(s) 22 and that the table retaining member(s) 22 can alternatively have any other suitable configuration.

Figure 8:
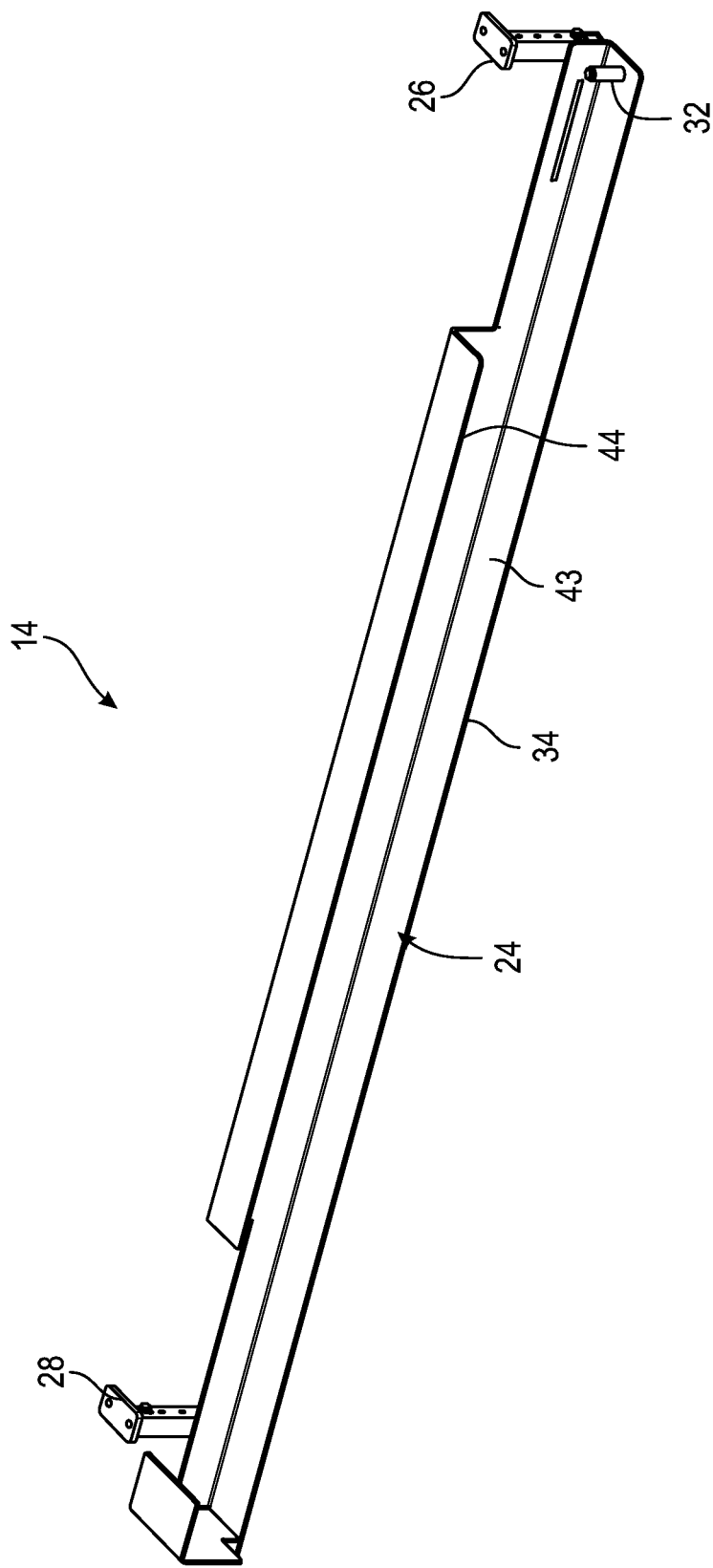
FIG. 8 is a perspective of a left rail assembly of the carrier of FIGS. 6 and 7.
Figure 9:
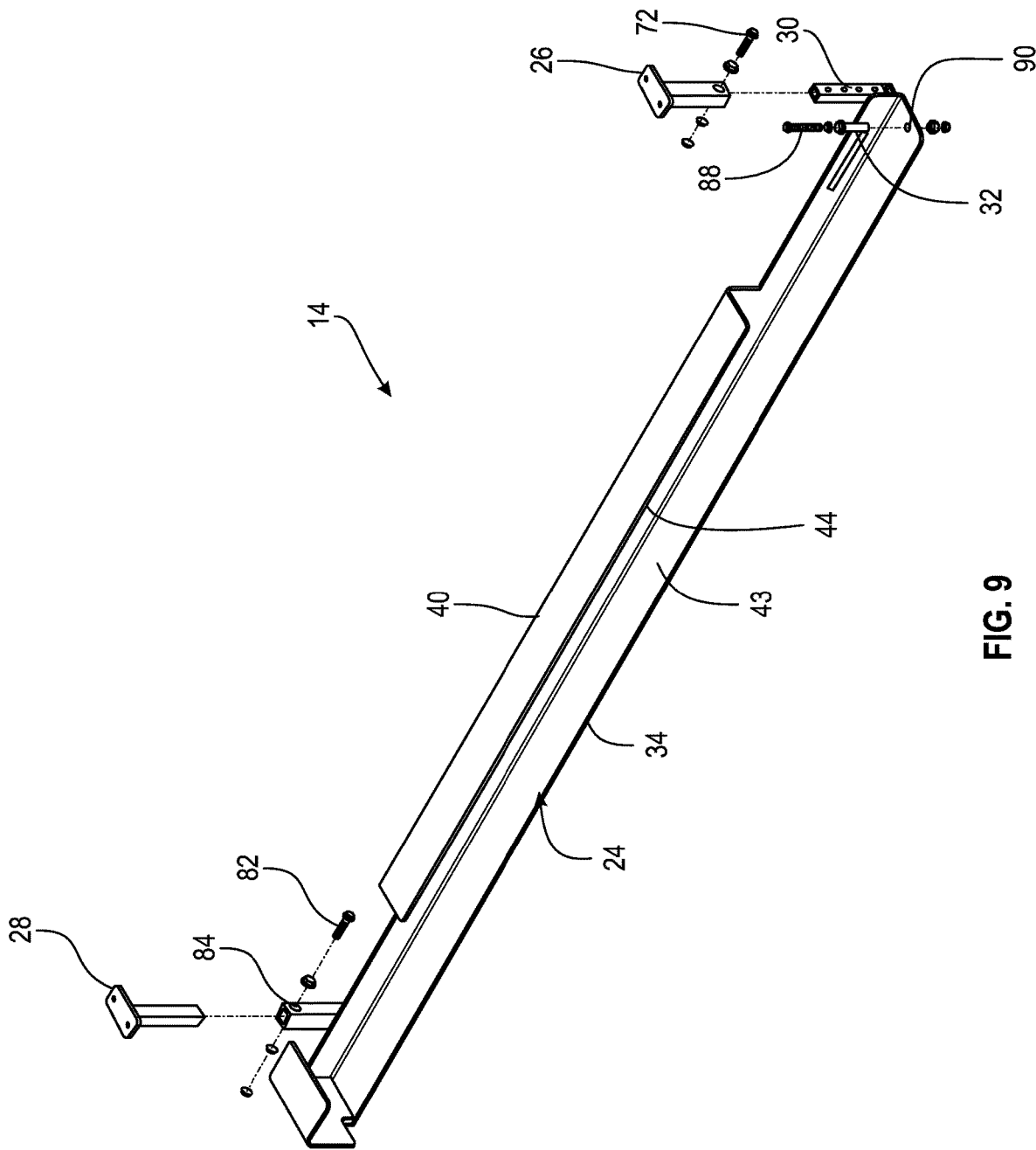
FIG. 9 is an exploded view of the left rail assembly of FIG. 8.

FIGS. 8 and 9 illustrate the left rail assembly 14 which includes a left rail 24, front and rear mounting brackets 26, 28 to be mounted spaced-apart along the length of the left rail 24 and upwardly extending from the left rail 24, a front mounting bracket extender 30, and the forward stop 32. It is noted that the left rail assembly 14 can alternatively have any other suitable configuration.

Figure 10:
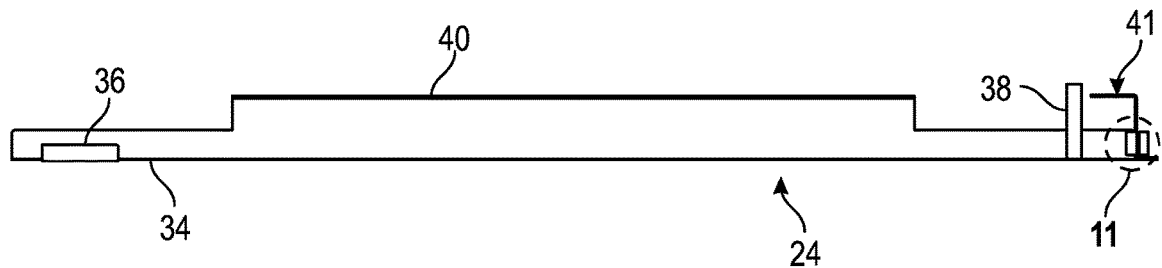
FIG. 10 is a is a left side view of a left rail of the left rail assembly of FIGS. 8 and 9.
Figure 11:
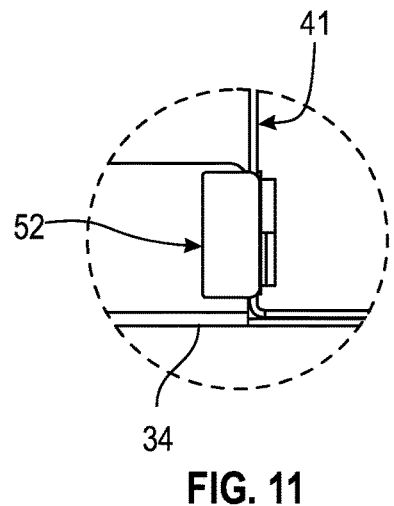
FIG. 11 is a fragmented and enlarged view of a portion of the left rail of FIG. 10.
Figure 12:
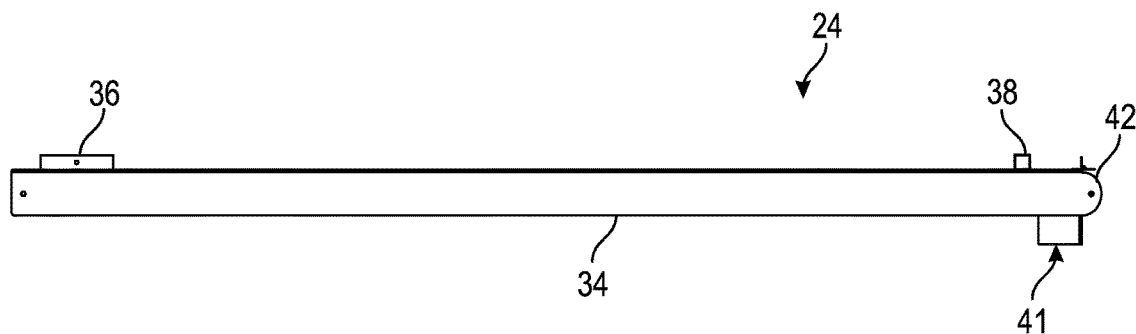
FIG. 12 is a is a bottom view of the left rail of FIGS. 10 and 11.

FIGS. 10 to 12 illustrate the left rail 24 which includes an elongate support 34, a front mounting bracket receiver 36, a rear mounting bracket receiver 38, at least one table retaining bracket 40, and a movable table retaining member 22 in the form of a left table retaining door 41. The illustrated elongate support 34 is in the form of an elongate angle bar having horizontal and vertical walls or legs. The horizontal wall or leg of the elongate support 34 is horizontal and extends in the forward/rearward direction. The illustrated rear end of the horizontal wall is semi-circular shaped to match the left table retaining door 41 as described in more detail below. There is also an opening 42 in the illustrated semi-circular shaped end that cooperates with the left table retaining door 41 as described in more detail below. The horizontal wall forms an upward-facing support surface 43 configured to engage and support a left edge of the foldable picnic table 12 thereon. The vertical wall of the elongate support 34 vertically and perpendicularly extends from an outer edge of the horizontal wall and thus also extends in the forward/rearward direction. The vertical wall forms an abutment or stop surface that limits lateral movement of the foldable picnic table 12 in the leftward direction. It is noted that the elongate support 34 can alternatively have any other suitable configuration.

The illustrated front mounting bracket receiver 36 is a square tube and is secured to an outer side of the vertical wall of the elongate support 34 near the bottom of the vertical wall and near the front end of the elongate support 34 in a horizontal orientation so that it can slidably receive a horizontal portion of the front mounting bracket extender 30 therein as discussed in more detail below. The illustrated front mounting bracket receiver 36 is secured to the elongate support 34 by welding but can alternatively be secured to the elongate support 34 in any other suitable manner. It is noted that the front mounting bracket receiver 36 can alternatively have any other suitable configuration.

The illustrated rear mounting bracket receiver 38 is a square tube and is secured to the outer side of the vertical wall of the elongate support 34 near the rear end of the elongate support 34 in a vertical orientation so that it can receive a vertical portion of the rear mounting bracket 28 as described in more detail below. The rear mounting bracket receiver 38 is provided with a horizontally-extending opening therein that cooperates with openings in the rear mounting bracket 28 to secure the rear mounting bracket 28 to the rear mounting bracket receiver 38 as described in more detail below (shown in FIG. 9). The illustrated rear mounting bracket receiver 38 is secured to the elongate support 34 by welding but can alternatively be secured to the elongate support any other suitable manner. It is noted that the rear mounting bracket receiver 38 can alternatively have any other suitable configuration.

The illustrated table retaining bracket 40 is located along the length of the elongate support 34 between the front and rear mounting bracket receivers 36, 38. The table retaining bracket 40 has a vertical portion or wall that is secured to the vertical wall of the elongate support 34 and extends above the vertical wall of the elongate support 34 and a horizontal portion or wall extending over and spaced-above the horizontal wall of the elongate support 34 an adequate distance so that it extends over a left edge of the foldable picnic table 12 when the foldable picnic table 12 is supported on the left rail 24. The illustrated table retaining bracket 40 is secured to the vertical wall of the elongate support 34 by welding but can alternatively be secured in any other suitable manner or alternatively can be formed integral with the vertical wall of the elongate support 34 as a one piece component. The lower side of the horizontal portion or wall of the table retaining bracket 40 forms an abutment or stop surface 44 that faces downward toward the upward-facing support surface 43 of the elongate support 34. The abutment or stop surface 44 provides an abutment that limits upward movement of the foldable picnic table 12 when supported on the support surface 43 of the elongate support 34. It is noted that any other suitable quantity (including zero) of the retaining bracket 40 can alternatively be utilized and/or the retaining bracket 40 can alternatively have any other suitable configuration.

As best shown in FIG. 13, the left table retaining door 41 includes a vertically-extending main portion or wall 46, a horizontally-extending top portion or wall 48 that extends from a top of the main wall 46, and a horizontally-extending bottom portion or wall 50 that extends from a bottom of the main wall 46 in a direction opposite the top wall 48. The left table retaining door 41 also includes a hinge 52 having a vertically extending pivot axis. One hinge plate of the hinge 52 is secured to a rearward side of the main wall 46 at a left edge of the main wall 46 and the other hinge plate of the hinge 52 is secured to a left side of the vertical wall of the elongate support 34 at a rear edge of the of the elongate support 34. The illustrated hinge plates are secured by welding but can alternatively be secured in any other suitable manner. Configured in this manner, the left table retaining door 41 moves or pivots between a blocking position and an unblocking position. In the blocking position, the main wall 46 extends laterally across the rear end of the support surface 43 of the horizontal wall of the elongate support 34 to limit rearward movement of the foldable picnic table 12 supported on the left rail 24 to prevent removal of the foldable picnic table 12 from the left rail 24 in the rearward direction or insertion of the foldable picnic table 12 onto the left rail 24 in the forward direction. In the unblocking position, the main wall 46 extends parallel to and rearward from the rear end of the vertical wall of the elongate support 34 to allow removal of the foldable picnic table 12 from the left rail 24 in the rearward direction or insertion of the foldable picnic table 12 onto the left rail 24 in the forward direction. The illustrated bottom wall 50 is semi-circular shaped to match the semi-circular-shaped rear end of the horizontal wall of the elongate support 34 when the left table retaining door 41 is in the blocking position. The illustrated bottom wall 50 has an opening 54 which aligns with the opening 42 in the horizontal wall of the elongate support 34 when the left table retaining door 41 is in the blocking position. A pod lock can be placed through openings 42, 54 to securely hold the left table retaining door 41 in the blocking position. Alternatively, a removable retaining clip such as, for example but not limited to, D-pins or D-clips or cotter pins are placed through openings 42, 54 to hold the left table retaining door 41 in the blocking position. The left table retaining door 41 can alternatively have any other suitable configuration.

As best shown in FIGS. 14 and 15, the illustrated front mounting bracket extender 30 includes a horizontal portion 60 and a vertical portion 62 extending upward from a front end of the horizontal portion. 60. The illustrated vertical portion 62 is a square tube that upwardly extends from the front end of the horizontal portion 60 which is also a square tube and is secured to the horizontal portion 60 by welding. It is noted that any other suitable method of securement can alternatively be utilized. The illustrated horizontal portion 60 is sized to be slidably received within the front mounting bracket receiver 36 of the left rail 24 in a telescopic manner. It should appreciated that the horizontal portion 60 and the front mounting bracket receiver 36 for a horizontal length or distance adjusting device so that the horizontal length or distance between the front and rear mounting brackets 26, 28 can be selectively adjusted. The illustrated vertical portion 62 is sized to be slidably received within the front mounting bracket 26 in a telescopic manner as described in more detail below. The illustrated vertical portion 62 has a plurality of spaced-apart fastener openings 64 in the vertical direction so that the height of the rear mounting bracket 28 relative to the support surface 43 of the left rail 24 can be adjusted. The illustrated vertical portion has four fastener openings 64 but any other suitable quantity can be alternatively utilized. It is noted that the front mounting bracket extender 30 can alternatively have any other suitable configuration.

Figure 16:
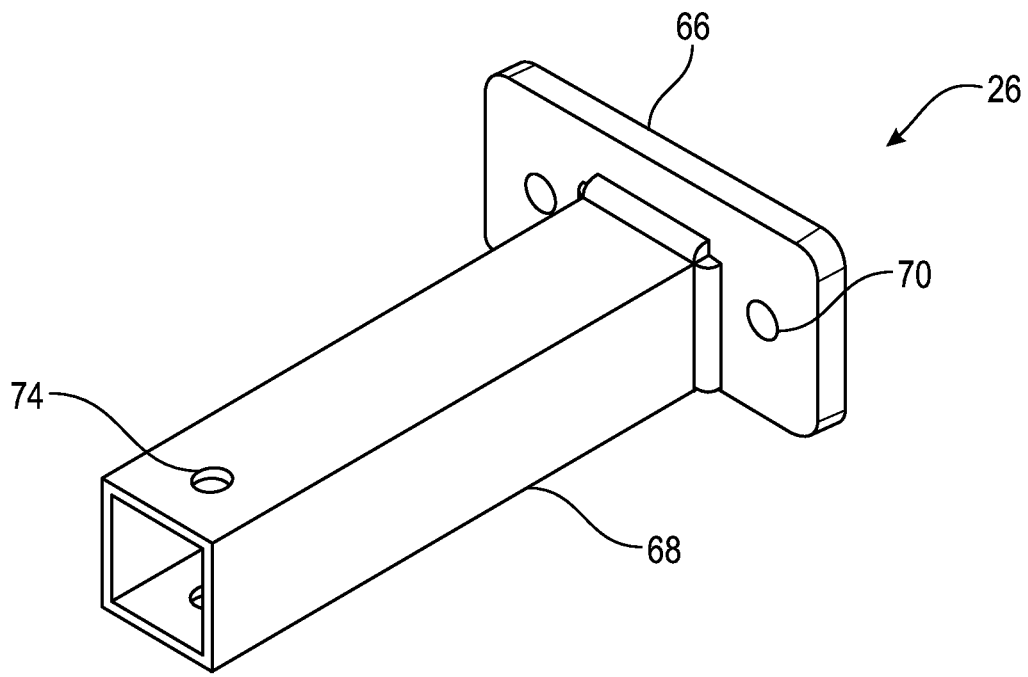
FIG. 16 is a perspective view of a rear mounting bracket of the left rail assembly of FIGS. 8 to 11.

As best shown in FIG. 16, the illustrated front mounting bracket 26 has a horizontal front mounting plate 66 and a front arm 68 downwardly extending from the bottom of the front mounting plate 66. The illustrated front mounting plate 66 is a flat and rectangular shaped plate having a pair of spaced-apart openings 70. The openings 70 are configured to receive bolts to secure the front mounting bracket to the undercarriage 18 of the recreational vehicle 20 with a pair of bolts (not shown). The illustrated front arm 68 is a square tube that downwardly extends from the bottom of the front mounting plate 66 and is secured to the front mounting plate 66 by welding. It is noted that any other suitable method of securement can alternatively be utilized. The illustrated front arm 68 is sized to slidably receive the vertical portion 62 of the front mounting bracket extender 30 in a telescopic manner near a front end of the left rail 24. The illustrated front mounting bracket 26 is secured to the front mounting bracket extender 30 with a mechanical fastener 72 in the form of a bolt, washer and locking nut but any other suitable method of securement can alternatively be utilized. The mechanical fastener 72 extends through a fastener opening 74 in the front arm 68 which is aligned with one of the plurality of spaced apart fastener openings 64 in the front mounting bracket extender 30. It should be appreciated that the front mounting bracket 26 and the front mounting bracket extender 30 form a height or adjustment device so that the height of the front mounting plate 66 relative to the support surface 43 of the left rail 24 can be selectively adjusted. It is noted that the front mounting bracket 26 can alternatively have any other suitable configuration.

Figure 17:
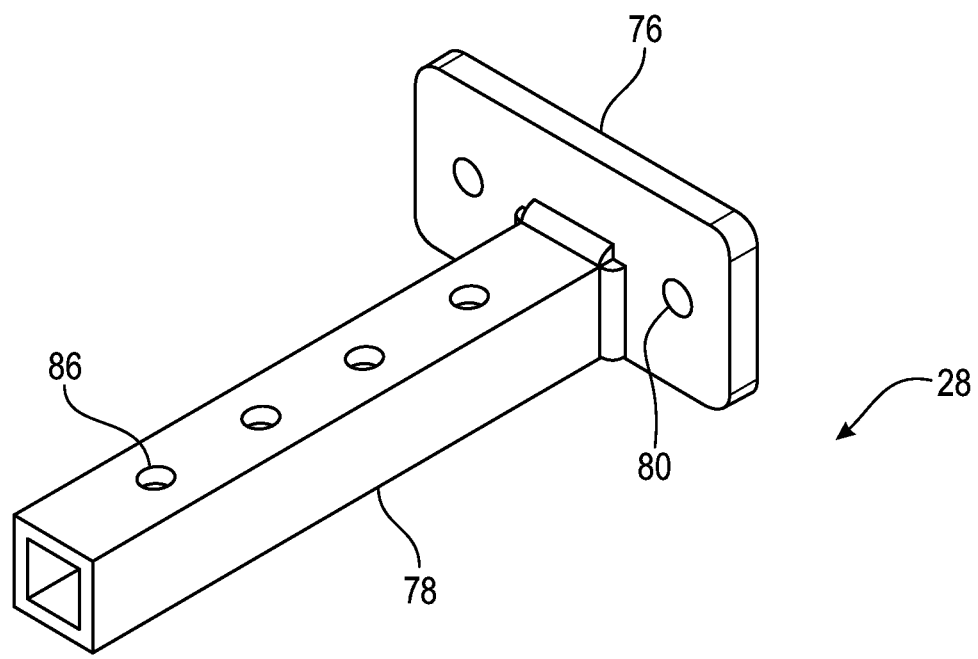
FIG. 17 is a perspective view of a front mounting bracket of the left rail assembly of FIGS. 8 to 11.

As best shown in FIG. 17 the illustrated rear mounting bracket 28 has a horizontal rear mounting plate 76 and a rear arm 78 downwardly extending from the bottom of the rear mounting plate 76. The illustrated rear mounting plate 76 is a flat and rectangular shaped plate having a pair of spaced-apart openings 80. The openings 80 are configured to receive bolts (not shown) to secure the rear mounting bracket 28 to the undercarriage 18 of the recreational vehicle 20 with a pair of bolts (not shown). The illustrated rear arm 78 is a square tube that downwardly extends from the bottom of the rear mounting plate 76 and is secured to the rear mounting plate 76 by welding. It is noted that any other suitable method securement can alternatively be utilized. The illustrated rear arm 78 is sized to be slidably received in the rear mounting bracket receiver 38 of the left rail 24 in a telescopic manner near a front end of the left rail 24. The illustrated rear mounting bracket 28 is secured to the rear mounting bracket receiver 38 with a mechanical fastener 82 in the form of a bolt, washer and locking nut but any other suitable method securement can alternatively be utilized. The mechanical fastener 82 extends through a fastener opening 84 in the rear mounting bracket receiver 38 which is aligned with a fastener opening 86 in the rear arm 78. The illustrated rear arm 78 has a plurality of the fastener openings 86 that are spaced-apart in the vertical direction. It should be appreciated that the rear mounting bracket 28 and the rear mounting bracket receiver 38 a height adjustment device so that the height of the rear mounting bracket 28 relative to the support surface 43 of the left rail 24 can be selectively adjusted. The illustrated rear arm has four of the fastener openings 86 but any other suitable quantity of fastener openings 86 can alternatively be utilized. It is noted that the rear mounting bracket 28 can alternatively have any other suitable configuration.

Configured in this manner, the left rail assembly 14 is adjustable in both the vertical and horizontal directions. In the vertical direction, the height of the front and rear mounting brackets 26, 28 above the left rail 24 can be adjusted to match a distance needed to secure the left rail 24 to the undercarriage 18 of the recreational vehicle 20 with adequate storage space and/or needed to provide adequate ground clearance between the bottom of the left rail 24 and the ground. Thus, the left rail 24 can be secured to a wide variety of different types and sizes of recreational vehicles 20 and the like that have components of varying sizes and locations extending below the undercarriage 18. In the horizontal direction, the distance between the front and rear mounting brackets 26, 28 can be adjusted to match a distance needed to secure the left rail assembly 14 to the undercarriage 18 of the recreational vehicle 20. It is noted that the illustrated rear mounting bracket 28 is adjustable in both the vertical and horizontal direction. Thus, the left rail assembly 14 can be secured to a wide variety of different types and sizes of recreational vehicles 20 and the like.

As shown in FIGS. 8 and 9, the illustrated forward stop 32 is secured near the forward end of the support surface 43 of elongate support 34. The illustrated forward stop 32 is a round tube that vertically extends in an upward direction from the horizontal portion of the elongate support 34 so that the forward stop 32 forms an abutment or stop that prevents forward movement of the foldable picnic table 12 off of the forward end of the elongate support 34. The illustrated forward stop 32 is secured to the elongate support 34 with a mechanical fastener 88 in the form of a bolt that extends through an opening 90 the horizontal portion of the elongate support 34 and locking nut that cooperates with the bolt. It is noted that the forward stop 32 can alternatively be secured in any other suitable manner. It is noted that the forward stop 32 can alternatively have any other suitable configuration.

Figure 18:
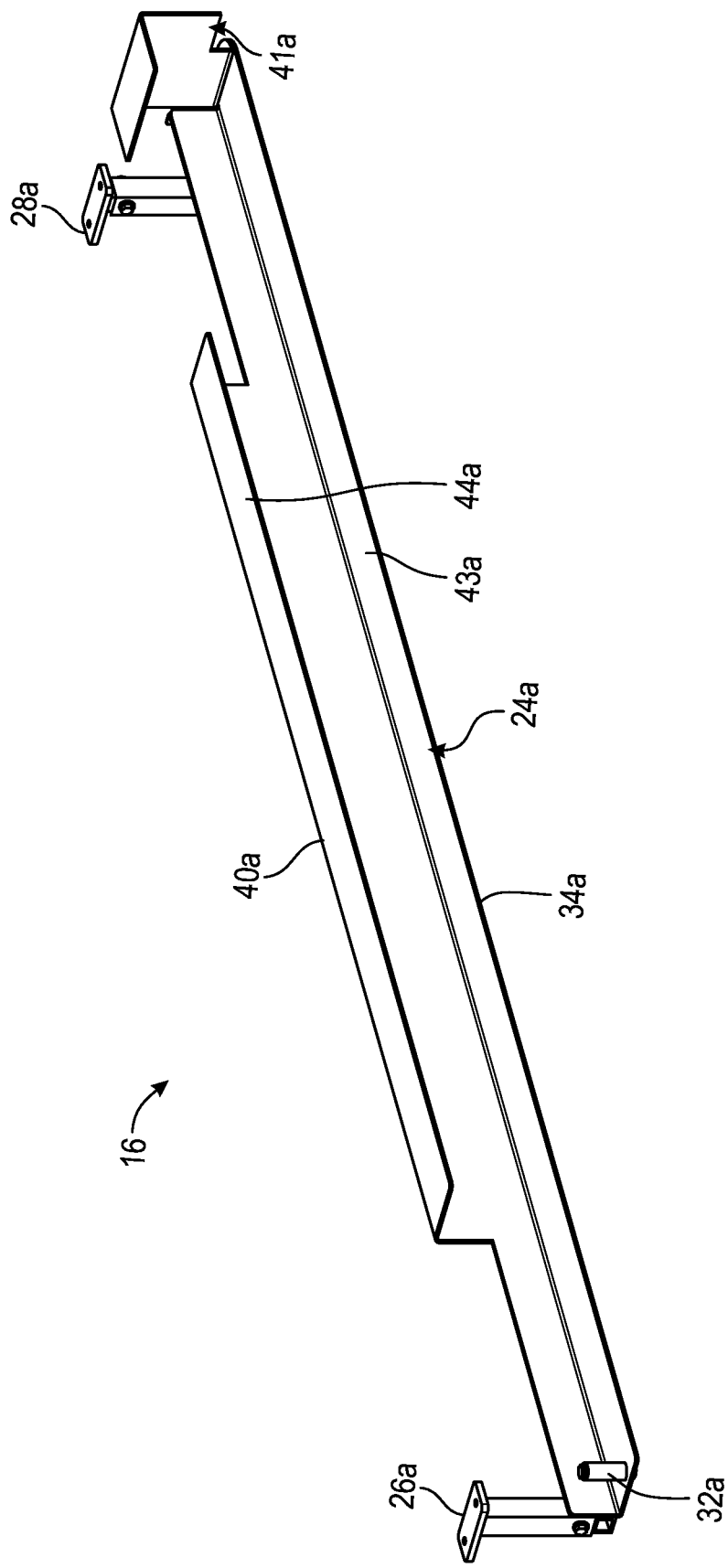
FIG. 18 is a perspective of a right rail assembly of the carrier of FIGS. 6 and 7.
Figure 19:
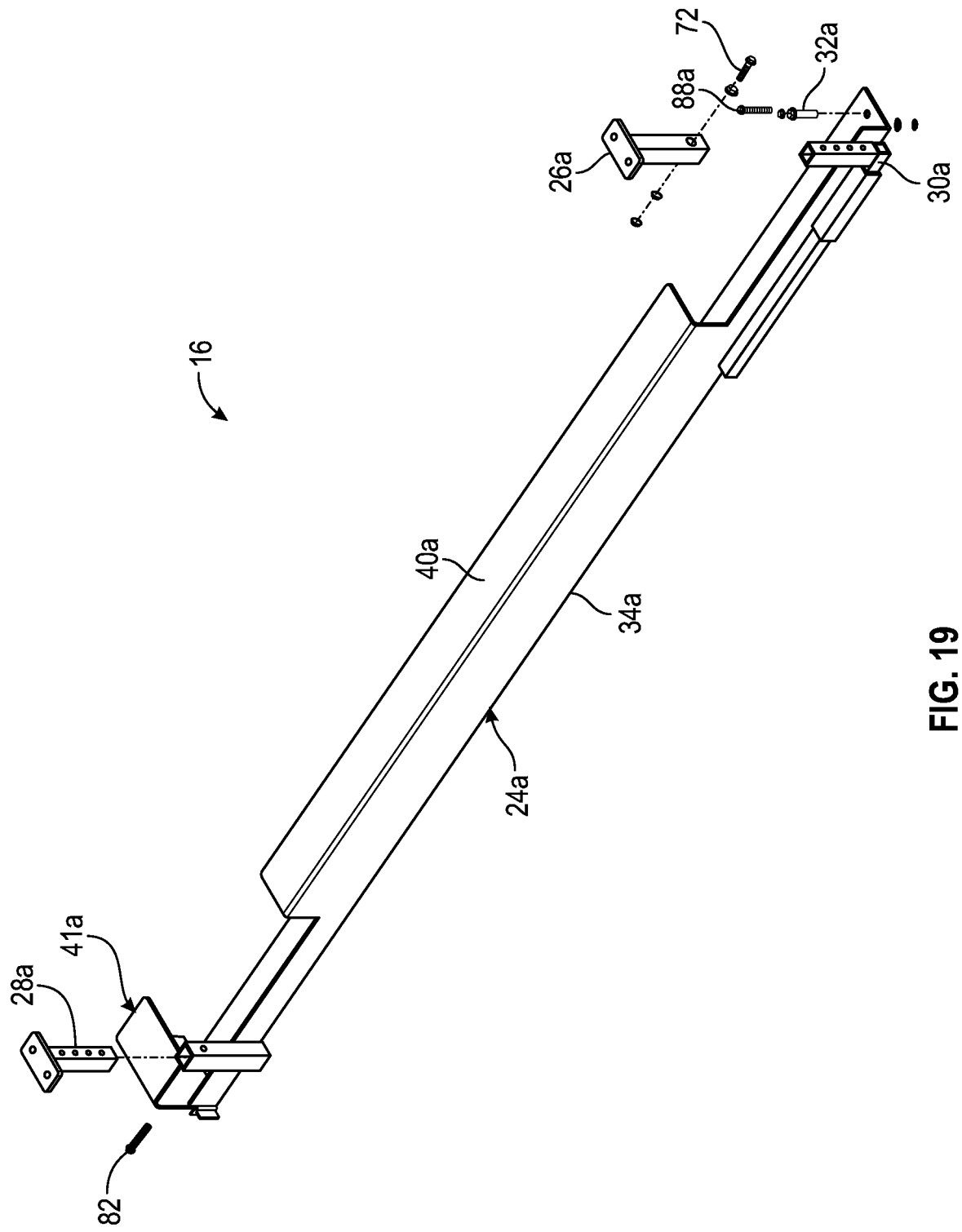
FIG. 19 is an exploded view of the right rail assembly of FIG. 18.

The illustrated right rail assembly 16 is a mirror image of the left rail assembly 14 described above but can alternatively have any other suitable configuration. FIGS. 18 and 19 illustrate the right rail assembly 16 which includes a right rail 24a, front and rear mounting brackets 26, 28 to be mounted spaced apart along the right rail 24a and upwardly extending from the right rail 24a, a front mounting bracket extender 30, and a forward stop 32a. It is noted that the right rail 14a can alternatively have any other suitable configuration.

Figure 20:
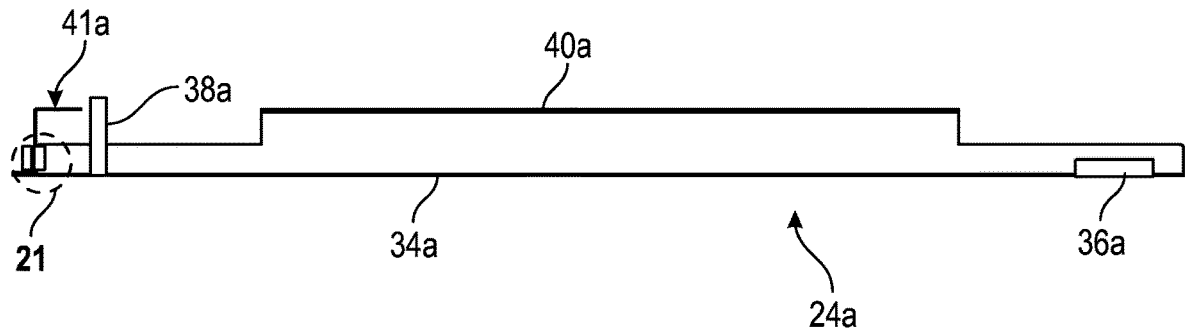
FIG. 20 is a is a right side view of a right rail of the right rail assembly of FIGS. 18 and 19.
Figure 21:
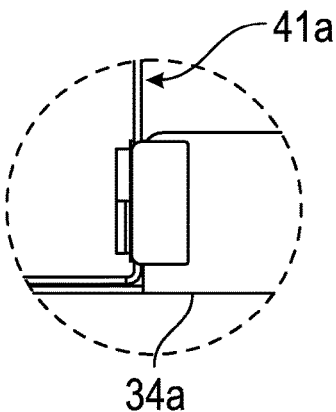
FIG. 21 is a fragmented and enlarged view of a portion of the right rail of FIG. 20.
Figure 22:
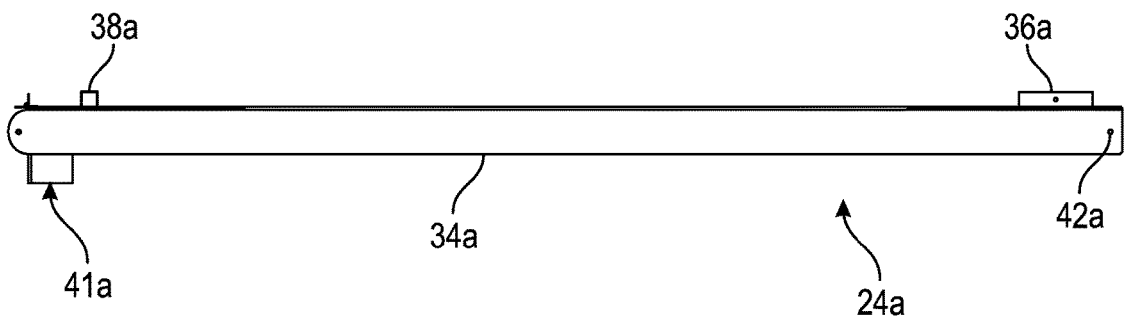
FIG. 22 is a is a bottom view of the right rail of FIGS. 20 and 21.

FIGS. 20 to 22 illustrate the right rail 24a which includes an elongate support 34a, a front mounting bracket receiver 36a, a rear mounting bracket receiver 38a, a retaining bracket 40a, and a movable table retaining member 22 in the form of a right table retaining door 41a. The illustrated elongate support 34a is in the form of an elongate angle bar having horizontal and vertical walls or legs. The horizontal wall or leg of the elongate support 34a is horizontal and extends in the forward/rearward direction. The illustrated rear end of the horizontal wall is semi-circular shaped to match the right table retaining door 41a as described in more detail below. There is also an opening 42a in the illustrated semi-circular shaped end that cooperates with the left table retaining door 41 as described in more detail below. The horizontal wall forms an upward-facing support surface 43a configured to engage and support a right edge of the foldable picnic table 12 thereon. The vertical wall of the elongate support 34 vertically and perpendicularly extends from an outer edge of the horizontal wall and thus also extends in the forward/rearward direction. The vertical wall forms an abutment or stop surface that limits lateral movement of the foldable picnic table 12 in the rightward direction. It is noted that the elongate support 34 can alternatively have any other suitable configuration.

The illustrated front mounting bracket receiver 36a is a square tube and is secured to an outer side of the vertical wall of the elongate support 34a near the bottom of the vertical wall and near the front end of the elongate support 34a in a horizontal orientation so that it can slidably receive a horizontal portion of the front mounting bracket extender 30 therein as discussed in more detail below. The illustrated front mounting bracket receiver 36a is secured to the elongate support 34a by welding but can alternatively be secured to the elongate support 34a in any other suitable manner. It is noted that the front mounting bracket receiver 36a can alternatively have any other suitable configuration.

The illustrated rear mounting bracket receiver 38a is a square tube and is secured to the outer side of the vertical wall of the elongate support 34a near the rear end of the elongate support 34 in a vertical orientation so that it can receive a vertical portion of the rear mounting bracket 28 as described in more detail below. The rear mounting bracket receiver 38a is provided with a horizontally-extending opening therein that cooperates with openings in the rear mounting bracket 28 to secure the rear mounting bracket 28 to the rear mounting bracket receiver 38a as described in more detail below (shown in FIG. 19). The illustrated rear mounting bracket receiver 38a is secured to the elongate support 34 by welding but can alternatively be secured to the elongate support 34a any other suitable manner. It is noted that the rear mounting bracket receiver 38a can alternatively have any other suitable configuration.

The illustrated table retaining bracket 40a is located along the length of the elongate support 34a between the front and rear mounting bracket receivers 36a, 38a. The table retaining bracket 40a has a vertical portion or wall that is secured to the vertical wall of the elongate support 34a and extends above the vertical wall of the elongate support 34a and a horizontal portion or wall extending over and spaced-above the horizontal wall of the elongate support 34a an adequate distance so that it extends over a right edge of the foldable picnic table 12 when the foldable picnic table 12 is supported on the right rail 24a. The illustrated table retaining bracket 40a is secured to the vertical wall of the elongate support 34a by welding but can alternatively be secured in any other suitable manner or alternatively can be formed integral with the vertical wall of the elongate support 34a as a one piece component. The lower side of the horizontal portion or wall of the table retaining bracket 40a forms an abutment or stop surface 44a that faces downward toward the upward-facing support surface 43a of the elongate support 34a. The stop surface 44a provides an abutment that limits upward movement of the foldable picnic table 12 when supported on the support surface 43a of the elongate support 34a. It is noted that any other suitable quantity (including zero) of the retaining bracket 40a can alternatively be utilized and/or the retaining bracket 40a can alternatively have any other suitable configuration.

Figure 23:
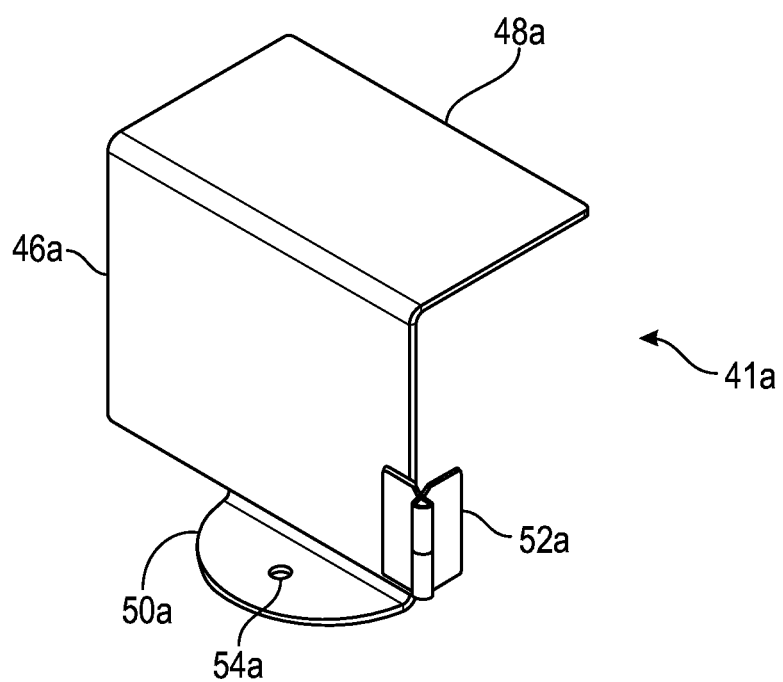
FIG. 23 is a is a perspective view of a right table retaining door of the right rail of FIGS. 20 to 22.
Figure 24:
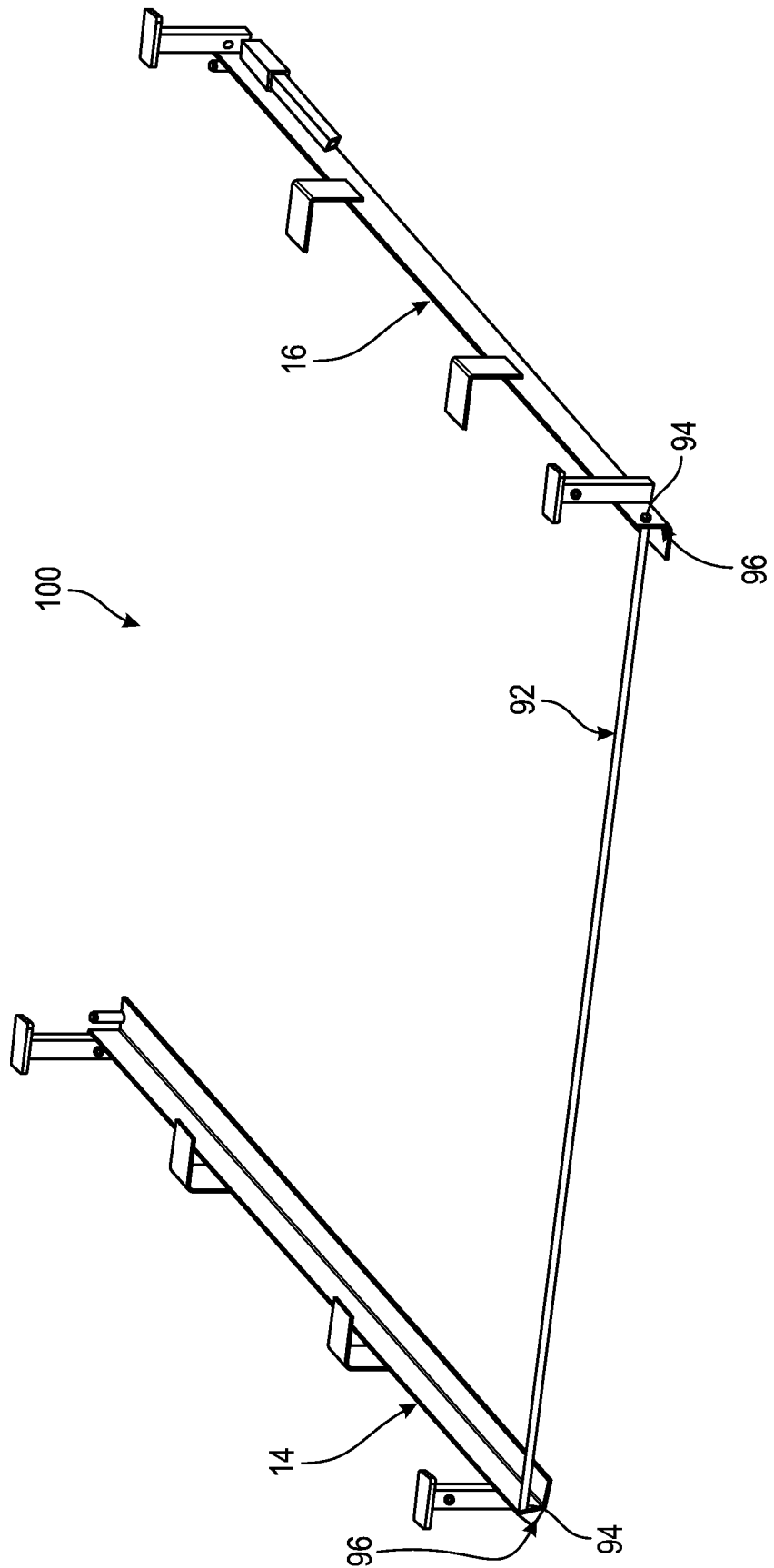
FIG. 24 is a perspective view of a carrier according to a second embodiment of the invention.
Figure 25:
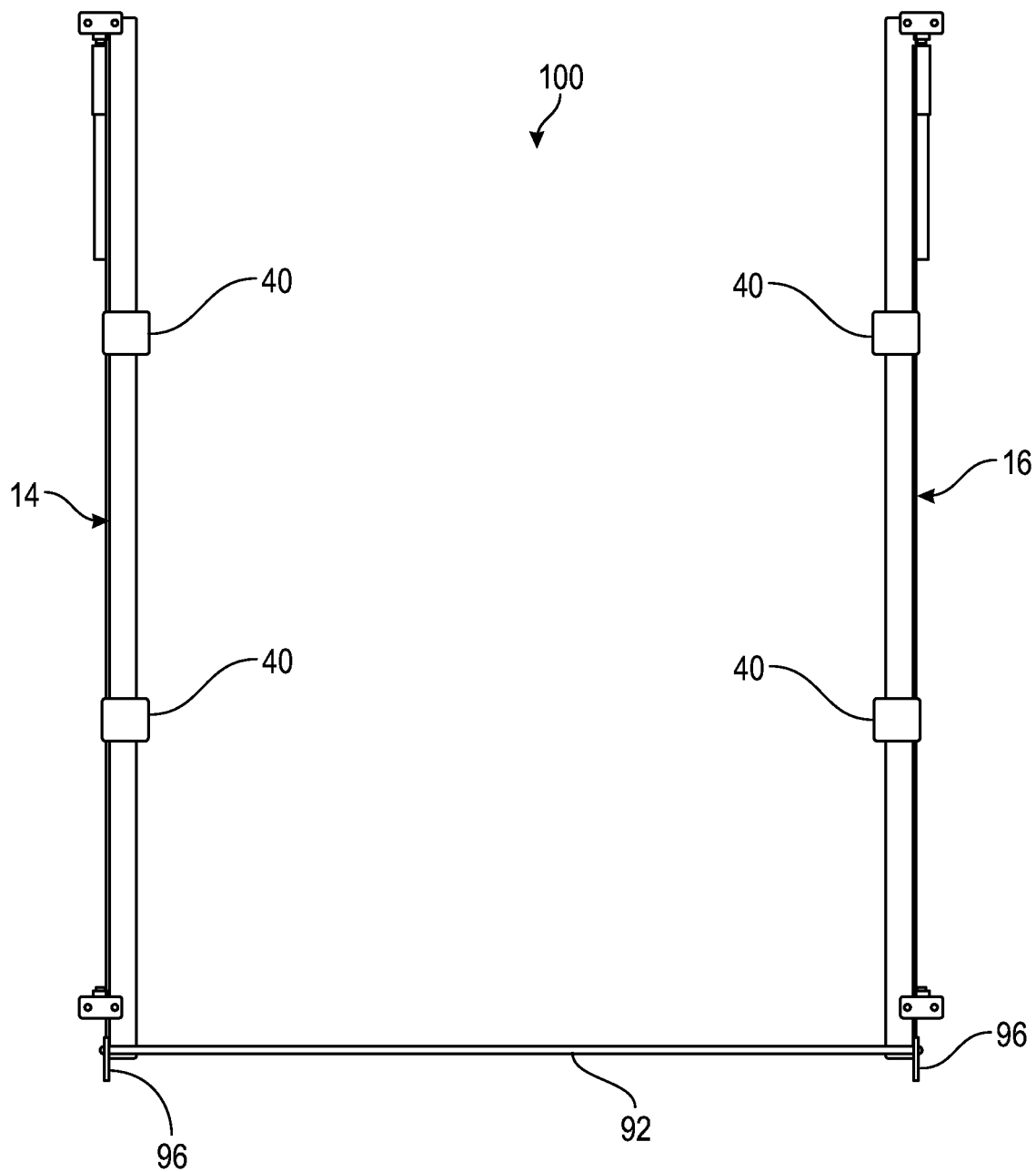
FIG. 25 is a top view of the carrier of FIG. 24.
Figure 26:
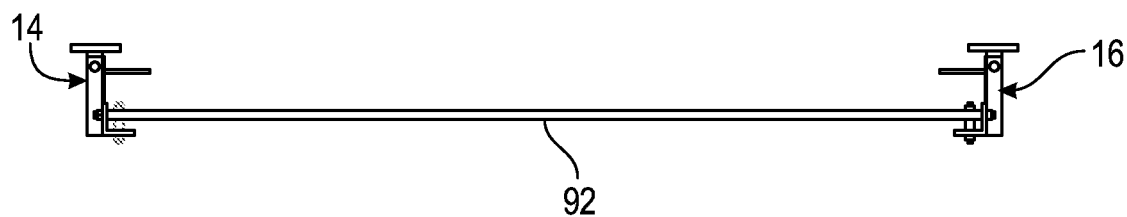
FIG. 26 is a front view of the carrier of FIGS. 24 and 25.

As best shown in FIG. 23, the right table retaining door 41a includes a vertically-extending main portion or wall 46a, a horizontally extending top portion or wall 48a that extends from a top of the main wall 46a, and a horizontally-extending bottom portion or wall 50a that extends from a bottom of the main wall 46a in a direction opposite the top wall 48a. The right table retaining door 41a also includes a hinge 52a having a vertically extending pivot axis. One hinge plate of the hinge 52a is secured to a rearward side of the main wall 46a at a right edge of the main wall 46a and the other hinge plate of the hinge 52a is secured to a right side of the vertical wall of the elongate support 34a at a rear edge of the elongate support 34. The illustrated hinge plates are secured by welding but can alternatively be secured in any other suitable manner. Configured in this manner, the right table retaining door 41a moves or pivots between a blocking position and an unblocking position. In the blocking position, the main wall 46a extends laterally across the rear end of the support surface 43a of the horizontal wall of the elongate support 34a to limit rearward movement of the foldable picnic table 12 supported on the right rail 24a to prevent removal of the foldable picnic table 12 from the right rail 24a in the rearward direction or insertion of the foldable picnic table 12 onto the right rail 24a in the forward direction. In the unblocking position, the main wall 46a extends parallel to and rearward from the rear end of the vertical wall of the elongate support 34a to allow removal of the foldable picnic table 12 from the right rail 24a in the rearward direction or insertion of the foldable picnic table 12 onto the right rail 24a in the forward direction. The illustrated bottom wall 50a is semi-circular shaped to match the semi-circular rear end of the horizontal wall of the elongate support 34a when the right table retaining door 41a is in the blocking position. The illustrated bottom wall 50a has an opening 54a which aligns with the opening 42a in the horizontal wall of the elongate support 34a when the right table retaining door 41a is in the blocking position. A pod lock can be placed through openings 42a, 54a to securely hold the right table retaining door 41a in the blocking position. Alternatively, a removable retaining clip such as, for example but not limited to, D-pins or D-clips or cotter pins are placed through openings 42a, 54a to hold the right table retaining door 41a in the blocking position. The right table retaining door 41a can alternatively have any other suitable configuration. It is noted that the illustrated retaining doors 41,41a permit the left and right rail assemblies 14, 16 to be spaced in any desired amount in order to accommodate a variety of different sized of foldable picnic tables 21.

The illustrated front mounting bracket 26, the illustrated rear mounting bracket 28, and the illustrated front mounting bracket extender 30 of the right rail assembly 16 are the same as those shown in FIGS. 14 to 17 and described above with regard to the left rail assembly 14. It is noted that the front mounting bracket 26, the rear mounting bracket 28, and the front mounting bracket extender 30 of the right rail assembly 16 can alternatively have any other suitable configuration.

Configured in this manner, the right rail assembly 16 is adjustable in both the vertical and horizontal directions. In the vertical direction, the height of the front and rear mounting brackets 26, 28 above the right rail 24a can be adjusted to match a distance needed to secure the right rail 24a to the undercarriage 18 of the recreational vehicle 20 with adequate storage space and/or needed to provide adequate ground clearance between the bottom of the right rail 24a and the ground. Thus, the right rail 24a can be secured to a wide variety of different types and sizes of recreational vehicles 20 and the like that have components of varying sizes and locations extending below the undercarriage 18. In the horizontal direction, the distance between the front and rear mounting brackets 26, 28 can be adjusted to match a distance needed to secure the right rail assembly 16 to the undercarriage 18 of the recreational vehicle 20. It is noted that the illustrated rear mounting bracket 28 is adjustable in both the vertical and horizontal direction. Thus, the right rail assembly 16 can be secured to a wide variety of different types and sizes of recreational vehicles 20 and the like.

As best shown in FIG. 19, the illustrated forward stop 32a is secured near the forward end of the support surface 43a of elongate support 34a. The illustrated forward stop 32a is a round tube that vertically extends in an upward direction from the horizontal portion of the elongate support 34a so that the forward stop 32a forms an abutment or stop that prevents forward movement of the foldable picnic table 12 off of the forward end of the elongate support 34a. The illustrated forward stop 32a is secured to the elongate support 34a with a mechanical fastener 88a in the form of a bolt that extends through an opening 90a the horizontal portion of the elongate support 34 and locking nut that cooperates with the bolt. It is noted that the forward stop 32a can alternatively be secured in any other suitable manner. It is noted that the forward stop 32a can alternatively have any other suitable configuration.

FIGS. 24 to 29 illustrate a carrier 100 according to a second embodiment of the invention. The carrier 100 of the second embodiment is substantially the same as the carrier 10 according to the first embodiment except that the movable table retaining member 22 is in the form of a table retaining bar 92 instead of the table retaining doors 41, 41a and that there is a pair of spaced-apart table retaining brackets 40 instead of a single table retaining bracket 40.

The illustrated table retaining bar 92 is removably secured to the left and right rail assemblies 14, 16 so that it can be easily removed for insertion and removal of the foldable picnic table 12 onto and off of the left and right rail assemblies 14, 16. The illustrated table retaining bar 92 is an elongate round bar that is sized to extend through openings 94 at the forward end of the vertical walls of left and right rails 24, 24a. Removable retaining clips 96 such as, for example but not limited to, R-pins or R-clips or cotter pins are placed through openings 98 near the ends of the table retaining bar 92 outside of the left and right rails 24, 24a to removably secure the table retaining bar 92 to the left and right rails 24, 24a. It is noted that the table retaining bar 92 can alternatively be secured to the left and right rails 24, 24a in any other suitable manner. Secured in this position, the table retaining bar 92 extends over the forward ends of the support surfaces 43, 43a of the left and right rails 24, 24a to prevent forward movement of the foldable picnic table 12 off of the left and right rails 24, 24a in the rearward direction. It is noted that the retaining bar 92 can have any other suitable configuration. It is also noted that multiple retaining bars 92 of different lengths and/or a plurality of the openings 98 spaced apart along the length of the retaining bar in order to permit the left and right rail assemblies 14, 16 to be spaced in any desired amount in order to accommodate a variety of different sized of foldable picnic tables 21.

Each of the illustrated components of the carrier 12 are formed of steel. It is noted however, that any other suitable material or materials can alternatively be utilized. It is also noted that each of the steal components be treated for weather resistance such as, for example but not limited to, power coating.

To place the foldable picnic table 12 into the carrier 10 for travel, the table retaining members 22 are moved to an unblocking position or removed. The foldable picnic table 12 is then slid onto the support surfaces 43, 43a of the left and right rail assemblies 14, 16 and below the table retaining brackets 40 of the left and right rail assemblies 14, 16 until the foldable picnic table 12 engages the forward stops 32 of the left and right rail assemblies 14, 16. The table retaining members 22 are then either returned to their blocking positions and locked in place or reinstalled. and locked in place. Secured in this manner, movement of the foldable picnic table 12 within the carrier 10 is limited in every direction. To remove the foldable picnic table 12 from the carrier10, the above-described steps are reversed.

It is noted that each of the features of the various disclosed embodiments of the present invention can be utilized in any combination with each of the other disclosed embodiments of the present invention.

From the above disclosure it can be appreciated that the systems, methods and devices according to the present invention can provide reliable, inexpensive, convenient and effective means for carrying a foldable picnic table on the exterior of a wide variety of different types and sizes of recreational vehicles and the like.

The preferred embodiments of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. A carrier for supporting a table at an undercarriage of a recreational vehicle, said carrier comprising, in combination:
   a left rail assembly including a left rail forming an upward-facing support surface configured to engage and support the table thereon, and front and rear mounting brackets spaced-apart along the left rail and upwardly-extending from the left rail;
   wherein the front and rear mounting brackets of the left rail are configured to be secured to the undercarriage of the recreational vehicle;
   wherein a height of the front and rear mounting brackets above the left rail is adjustable;
   a right rail assembly including a right rail forming an upward-facing support surface configured to engage and support the table thereon, and front and rear mounting brackets spaced-apart along the right rail and upwardly-extending from the right rail;
   wherein the front and rear mounting brackets of the right rail are configured to be secured to the undercarriage of the recreational vehicle; and
   wherein a height of the front and rear mounting brackets above the right rail is adjustable.

2. The carrier according to claim 1, wherein the front and rear mounting brackets of the right rail assembly are configured to adjust the height of the front and rear mounting brackets of the right rail assembly in a telescopic manner, and the front and rear mounting brackets of the left rail assembly are configured to adjust the height of the front and rear mounting brackets of the left rail assembly in a telescopic manner.

3. The carrier according to claim 2, wherein at least one of the front and rear mounting brackets of the right rail assembly are configured so that a distance between the front and rear mounting brackets of the right rail assembly is adjustable, and at least one of the front and rear mounting brackets of the left rail assembly are configured so that a distance between the front and rear mounting brackets of the left rail assembly is adjustable.

4. The carrier according to claim 3, wherein at least one of the front and rear mounting brackets of the right rail assembly are configured so that a distance between the front and rear mounting brackets of the right rail assembly is adjustable in a telescopic manner, and at least one of the front and rear mounting brackets of the left rail assembly are configured so that a distance between the front and rear mounting brackets of the left rail assembly is adjustable in a telescopic manner.

5. The carrier according to claim 1, wherein at least one of the front and rear mounting brackets of the right rail assembly are configured so that a distance between the front and rear mounting brackets of the right rail assembly is adjustable, and at least one of the front and rear mounting brackets of the left rail assembly are configured so that a distance between the front and rear mounting brackets of the left rail assembly is adjustable.

6. The carrier according to claim 5, wherein at least one of the front and rear mounting brackets of the right rail assembly are configured so that a distance between the front and rear mounting brackets of the right rail assembly is adjustable in a telescopic manner, and at least one of the front and rear mounting brackets of the left rail assembly are configured so that a distance between the front and rear mounting brackets of the left rail assembly is adjustable in a telescopic manner.

7. The carrier according to claim 1, wherein the rear mounting bracket of the right rail assembly is configured to be adjustable in both the vertical direction and the horizontal direction relative to the right rail, and wherein the rear mounting bracket of the left rail assembly is configured to be adjustable in both the vertical direction and the horizontal direction relative to the left rail.

8. The carrier according to claim 7, wherein the rear mounting bracket of the right rail assembly is secured to the right rail with a right rear mounting bracket extender configured to adjust the rear mounting bracket in both the vertical direction and the horizontal direction relative to the right rail, and wherein the rear mounting bracket of the left rail assembly is secured to the left rail with a left rear mounting bracket extender configured to adjust rear mounting bracket in both the vertical direction and the horizontal direction relative to the left rail.

9. The carrier according to claim 1, further comprising at least one table retaining member extending between the left rail and the right rail and removably secured to both the left rail and the right rail at a rear end of the left and right rails.

10. A carrier for supporting a table at an undercarriage of a recreational vehicle, said carrier comprising, in combination:
    a left rail assembly including a left rail forming an upward-facing support surface configured to engage and support the table thereon, and front and rear mounting brackets spaced-apart along the left rail and upwardly-extending from the left rail;
    wherein the front and rear mounting brackets of the left rail are configured to be secured to the undercarriage of the recreational vehicle;
    wherein a distance between the front and rear mounting brackets of the left rail is adjustable;
    a right rail assembly including a right rail forming an upward-facing support surface configured to engage and support the table thereon, and front and rear mounting brackets spaced-apart along the right rail and upwardly-extending from the right rail;

wherein the front and rear mounting brackets of the right rail are configured to be secured to the undercarriage of the recreational vehicle; and wherein a distance between the front and rear mounting brackets of the right rail is adjustable.

11. The carrier according to claim 10, wherein at least one of the front and rear mounting brackets of the right rail assembly are configured so that a distance between the front and rear mounting brackets of the right rail assembly is adjustable in a telescopic manner, and at least one of the front and rear mounting brackets of the left rail assembly are configured so that a distance between the front and rear mounting brackets of the left rail assembly is adjustable in a telescopic manner.

12. The carrier according to claim 10, wherein the rear mounting bracket of the right rail assembly is configured to be adjustable in both the vertical direction and the horizontal direction relative to the right rail, and wherein the rear mounting bracket of the left rail assembly is configured to be adjustable in both the vertical direction and the horizontal direction relative to the left rail.

13. The carrier according to claim 12, wherein the rear mounting bracket of the right rail assembly is secured to the right rail with a right rear mounting bracket extender configured to adjust the rear mounting bracket in both the vertical direction and the horizontal direction relative to the right rail, and wherein the rear mounting bracket of the left rail assembly is secured to the left rail with a left rear mounting bracket extender configured to adjust rear mounting bracket in both the vertical direction and the horizontal direction relative to the left rail.

14. The carrier according to claim 10, further comprising at least one table retaining member extending between the left rail and the right rail and removably secured to both the left rail and the right rail at a rear end of the left and right rails.

15. A carrier for supporting a table at an undercarriage of a recreational vehicle, said carrier comprising, in combination:

a left rail assembly including a left rail forming an upward-facing support surface configured to engage and support the table thereon, and front and rear mounting brackets spaced-apart along the left rail and upwardly-extending from the left rail;

wherein the front and rear mounting brackets of the left rail are configured to be secured to the undercarriage of the recreational vehicle;

a right rail assembly including a right rail forming an upward-facing support surface configured to engage and support the table thereon, and front and rear mounting brackets spaced-apart along the right rail and upwardly-extending from the right rail;

wherein the front and rear mounting brackets of the right rail are configured to be secured to the undercarriage of the recreational vehicle; and at least one table retaining member selectively movable between a blocking position wherein the table retaining member blocks the table from being removed from the left and right rails and an unblocking position wherein the table retaining member permits the table to be removed from the left and right rails.

16. The carrier according to claim 15, wherein the table retaining member comprises left and right table retaining doors secured to the left and right rails respectively.

17. The carrier according to claim 16, wherein the left and right table retaining doors are secured to the left and right rails by hinges and pivot between the blocking and unblocking positions.

18. The carrier according to claim 16, wherein at least one of the left and right table retaining doors are configured to be held in the blocking position by a pad lock.

19. The carrier according to claim 15, wherein the table retaining member comprises a table retaining bar extending between the left rail and the right rail and removably secured to both the left rail and the right rail.

20. The carrier according to claim 15, further comprising at least one clip for securing the table retaining bar to the left and right rails.

* * * * *